United States Patent
Lee et al.

(10) Patent No.: US 8,380,983 B2
(45) Date of Patent: Feb. 19, 2013

(54) FILE ENCRYPTION SYSTEM AND METHOD

(75) Inventors: Chung-I Lee, Taipei Hsien (TW);
Chien-Fa Yeh, Taipei Hsien (TW);
Shan-Chuan Jeng, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 380 days.

(21) Appl. No.: 12/820,033

(22) Filed: Jun. 21, 2010

(65) Prior Publication Data
US 2011/0099369 A1    Apr. 28, 2011

(30) Foreign Application Priority Data
Oct. 22, 2009    (CN) .......................... 2009 1 0308653

(51) Int. Cl.
*H04L 29/06*    (2006.01)

(52) U.S. Cl. ....................................................... 713/156

(58) Field of Classification Search .................. 713/156; 380/281
See application file for complete search history.

(56) References Cited

U.S. PATENT DOCUMENTS

| | | | | |
|---|---|---|---|---|
| 6,996,251 | B2 * | 2/2006 | Malone et al. ................ | 382/100 |
| 2002/0165912 | A1 * | 11/2002 | Wenocur et al. .............. | 709/203 |
| 2007/0150517 | A1 * | 6/2007 | Malone ....................... | 707/104.1 |

* cited by examiner

*Primary Examiner* — Jason Gee
(74) *Attorney, Agent, or Firm* — Altis Law Group, Inc.

(57) ABSTRACT

An electronic document comparison system and method converts a test file into a compressed file having a specific format. A public key of the CA certificate of a user is obtained and a random key is generated using a random function. Furthermore, the compressed file is symmetrically encrypted using the random key, and the random key is asymmetrically encrypted using the public key to generate an asymmetric encryption key. A header of the compressed file is attached with the asymmetric encryption key and data length of the asymmetric encryption key.

20 Claims, 5 Drawing Sheets

FILE ENCRYPTION SYSTEM AND METHOD

BACKGROUND

1. Technical Field

Embodiments of the present disclosure relate to file processing technology, and particularly to a file encryption system and method.

2. Description of Related Art

Due to the growth of sensitive information stored in computers or transmitted over networks, the need to ensure security of the sensitive information has risen multifold. For example, confidential electronic files in computers may be encrypted by users. However, because electronic files comprise a variety of file formats, such as WORD files, portable document format (PDF) files, and joint photographic experts group (JPEG) files, each file format often requires a different plug-in program to encrypt the confidential electronic files. For example, if a user wants to encrypt a WORD file, a plug-in program corresponding to the WORD file needs to be installed. Therefore, it is inconvenient and time-wasting to encrypt electronic files, especially when the electronic files include at least two format files.

What is needed, therefore, is an improved system and method for encrypting files.

DETAILED DESCRIPTION

All of the processes described below may be embodied in, and fully automated via, function modules executed by one or more general purpose processors of a computer. Some or all of the methods may alternatively be embodied in specialized hardware. The function modules may be stored in any type of computer-readable medium or other computer storage device.

Figure 1:
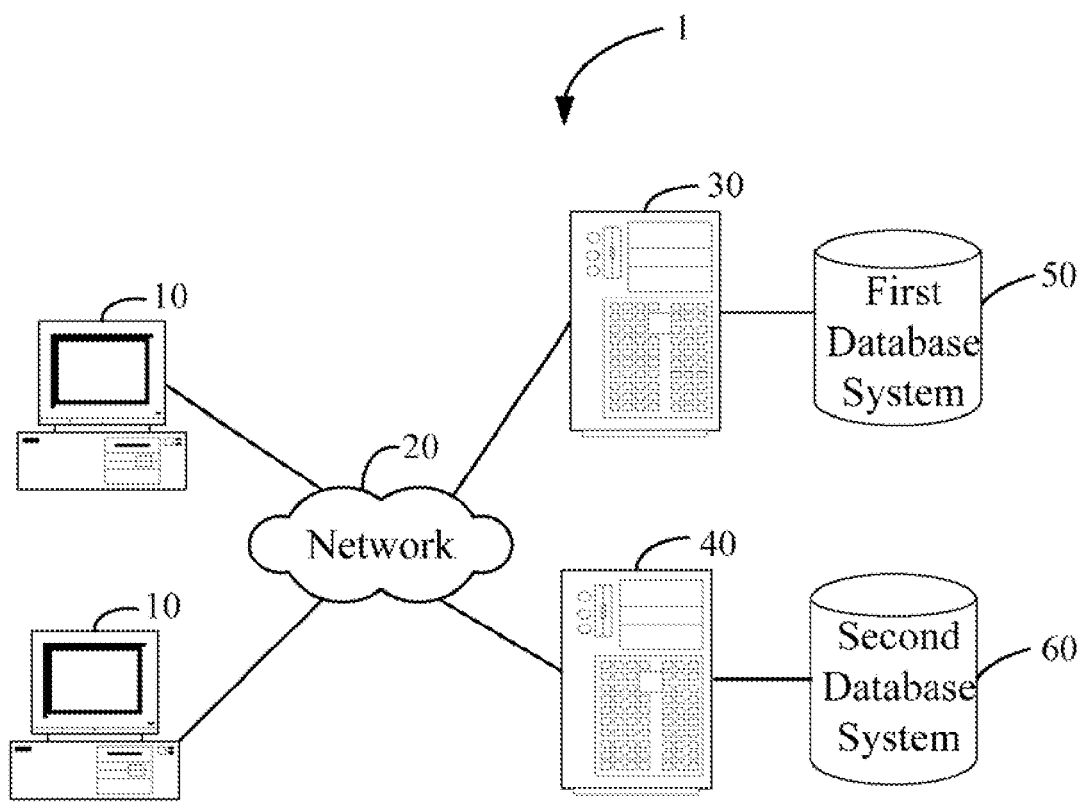
FIG. 1 is a system view of one embodiment of a file encryption system.

FIG. 1 is a block diagram of one embodiment of a file encryption system 1. In one embodiment, the file encryption system 1 may comprise a file encryption server 30, a certificate authority (CA) server 40, and one or more client computers 10. The file encryption system 1 may be used to automatically encrypt files. In the exemplary embodiment, the file encryption server 30, the CA server 40, and the one or more client computers 10 connect to a network 20. The network 20 may be, but is not limited to, a wide area network (e.g., the Internet) or a local area network.

The file encryption server 30 electronically connects to a first database system 50 using open database connectivity (ODBC) or java database connectivity (JDBC), for example. In one embodiment, the file encryption server 30 may be a personal computer (PC), a network server, or any other data-processing equipment. The first database system 50 may store files encoded in a variety of formats, such as WORD files, joint photographic experts group (JPEG) files, portable document format (PDF) files. Additionally, each of the one or more client computers 10 provides an operation interface for controlling one or more operations of the file encryption server 30.

The CA server 40 electronically connects to a second database system 60 using the ODBC or the JDBC, for example. In one embodiment, the CA server 40 may be a personal computer (PC), a network server, or any other data-processing equipment. The second database system 60 may store information of users, such as a CA certificate of the user.

Figure 2:
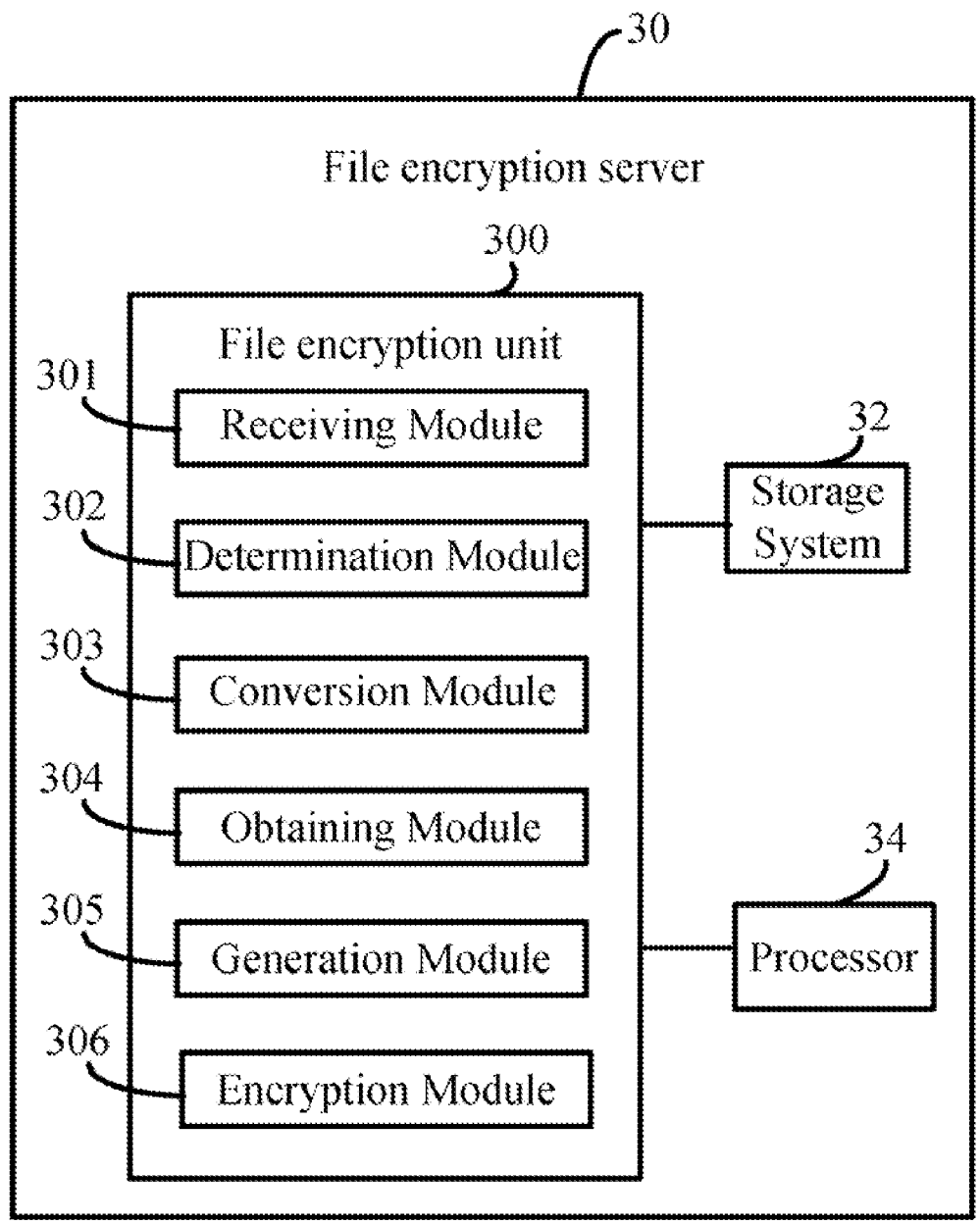
FIG. 2 is a block diagram of one embodiment of a file encryption server of FIG. 1.

FIG. 2 is a block diagram of one embodiment of the file encryption server 30 including a file encryption unit 300. The file encryption unit 300 may be used to automatically encrypt files. In one embodiment, the file encryption unit 300 includes a receiving module 301, a determination module 302, a conversion module 303, an obtaining module 304, a generation module 305, and an encryption module 306. One or more computerized codes of the modules 301-306 are stored in a storage system 32 of the file encryption server 30. One or more general purpose or specialized processors, such as a processor 34 executes the computerized codes of the modules 301-306 to provide one or more operations of the file encryption unit 300.

The receiving module 301 receives a login request of the user from the client computer 10 to encrypt a test file stored in the first database system 50. In one embodiment, the user can input a name and password using an input system of the client computer 10, where the client computer 10 sends the login request to the file encryption server 30. The input system may comprise a mouse, a keyboard, or a virtual keyboard, for example.

The determination module 302 determines if the CA certificate of the user is valid. In one embodiment, the determination module 302 determines if the CA certificate of the user is valid on the condition that the CA certificate of the user is not expired.

The conversion module 303 converts the test file into a compressed file having a specific format. In one embodiment, the specific format is a compression format, and the extension of the compression format is "*.hhi." By using the specific format, the test file may store both text sections and image sections with a high compression ratio. Further details regarding how to convert the test file into the compressed file are described with respect to FIG. 4.

The obtaining module 304 sends a search request to the CA server 40 to obtain a public key of the CA certificate of the user. It is understood that each CA certificate of the user includes the public key, a serial number, and identity information (e.g., name and ID number) of the user. The obtaining module 304 obtains the public key of the CA certificate of the user from the CA server 40 through the network 20.

The generation module 305 generates a random key using a random function. In one embodiment, the random function may be, but is not limited to, a Win32 Crypto API(<wincrypt.h>).

The encryption module 306 symmetrically encrypts the compressed file using a symmetric encryption and the random key. It is understood that the symmetric encryption encrypts or decrypts the compressed file using the random key.

The encryption module 306 further asymmetrically encrypts the random key using the public key to generate an asymmetric encryption key (or private key). It may be understood that asymmetric cryptography includes a pair of keys known as an asymmetric encryption key and an asymmetric decryption key. An asymmetric encryption key cannot be used to determine a corresponding asymmetric decryption key.

The encryption module 306 further attaches the asymmetric encryption key and data length of the asymmetric encryption key to a header of the compressed file. In one embodiment, the header refers to supplemental data placed in the beginning of the compressed file. For example, the header may include information of a size, a name, a format, and a data length of the compressed file, or a size and a data length of the asymmetric encryption key and the like.

Figure 3:
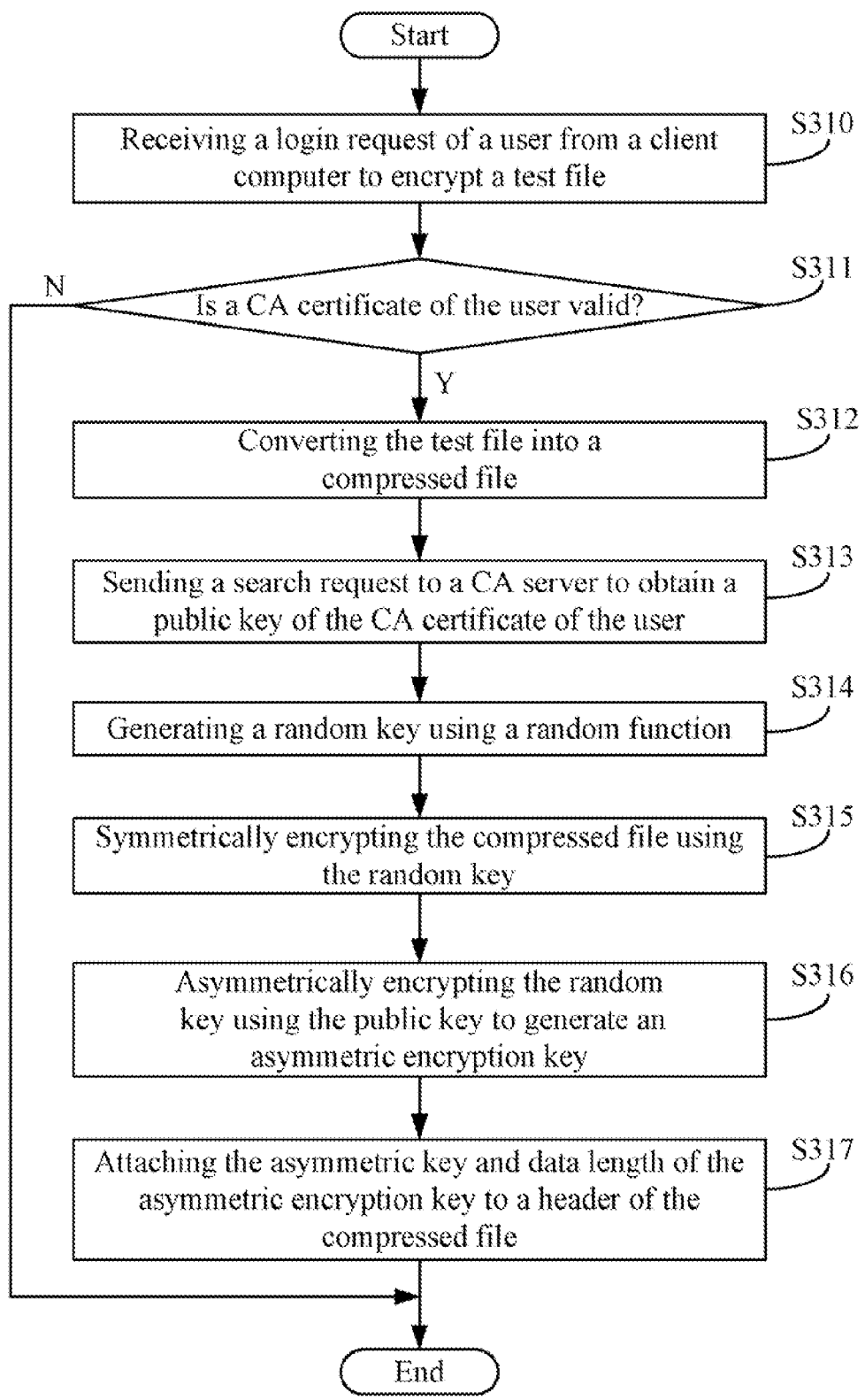
FIG. 3 is a flowchart of one embodiment of a file encryption method.

FIG. 3 is a flowchart of one embodiment of a file encryption method. Depending on the embodiment, additional blocks may be added, others deleted, and the ordering of the blocks may be changed.

In block S310, the receiving module 301 receives a login request of a user from the client computer 10 to encrypt a test file stored in the first database system 50. As mentioned above, the user inputs a name and password using client computer 10, then the client computer 10 sends the login request to the file encryption server 30 to encrypt the test file, such as a PDF file. It is understood that the login request may be generated when the user inputs a name and password using the client computer 10.

In block S311, the determination module 302 determines if the CA certificate of the user is valid. If the CA certificate of the user is valid, the process goes to block S312. If the CA certificate of the user is not valid, the procedure ends. As mentioned above, the CA certificate of the user is valid on the condition that the CA certificate of the user is not expired. In one embodiment, the determination module 302 compares an expiration date of the CA certificate of the user with the current date. If the current date is before the expiration date, the CA certificate of the user is not expired.

In block S312, the conversion module 303 converts the test file into a compressed file having a specific format. Further details regarding how to convert the test file into the compressed file are described with respect to FIG. 4.

In block S313, the obtaining module 304 sends a search request to the CA server 40 to obtain a public key of the CA certificate of the user. In one embodiment, the obtaining module 304 obtains the public key of the CA certificate of the user through the network 20.

In block S314, the generation module 305 generates a random key using a random function. In one embodiment, the random function may be, but is not limited to, a Win32 Crypto API(<wincrypt.h>).

In block S315, the encryption module 306 symmetrically encrypts the compressed file using the random key. It is understood that a symmetric encryption encrypts or decrypts the compressed file using the random key. In one embodiment, the encryption module 306 symmetrically encrypts the compressed file by using a data encryption standard (DES) algorithm. Depending on the embodiment, other encryption algorithms, such an advanced encryption standard (AES) algorithm may be used to symmetrically encrypt the compressed file.

In block S316, the encryption module 306 further asymmetrically encrypts the random key using the public key to generate an asymmetric encryption key (or private key). In one embodiment, the encryption module 306 asymmetrically encrypts the random key using an RSA encryption algorithm.

In block S317, the encryption module 306 further attaches the asymmetric encryption key and data length of the asymmetric encryption key to a header of the compressed file. In one embodiment, the header refers to supplemental data placed in the beginning of the compressed file. For example, the header may include information of a size, a name, a format, and a data length of the compressed file, or size and data length of the asymmetric encryption key and the like.

Figure 4:
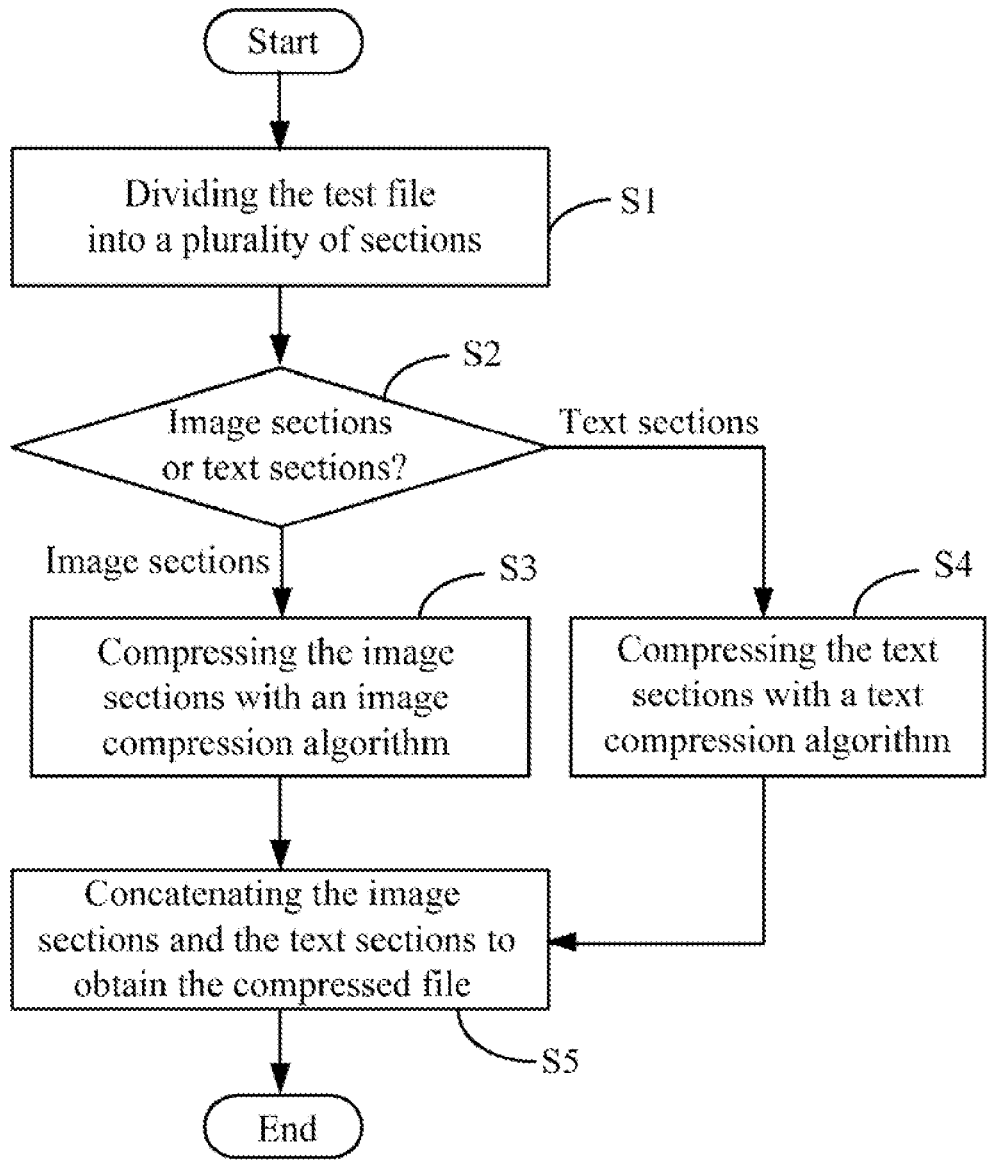
FIG. 4 is a detailed description of one embodiment of block 5312 for converting a test file into a compressed file in FIG. 3.

FIG. 4 is a detailed description of one embodiment of block S312 in FIG. 3.

Figure 5:
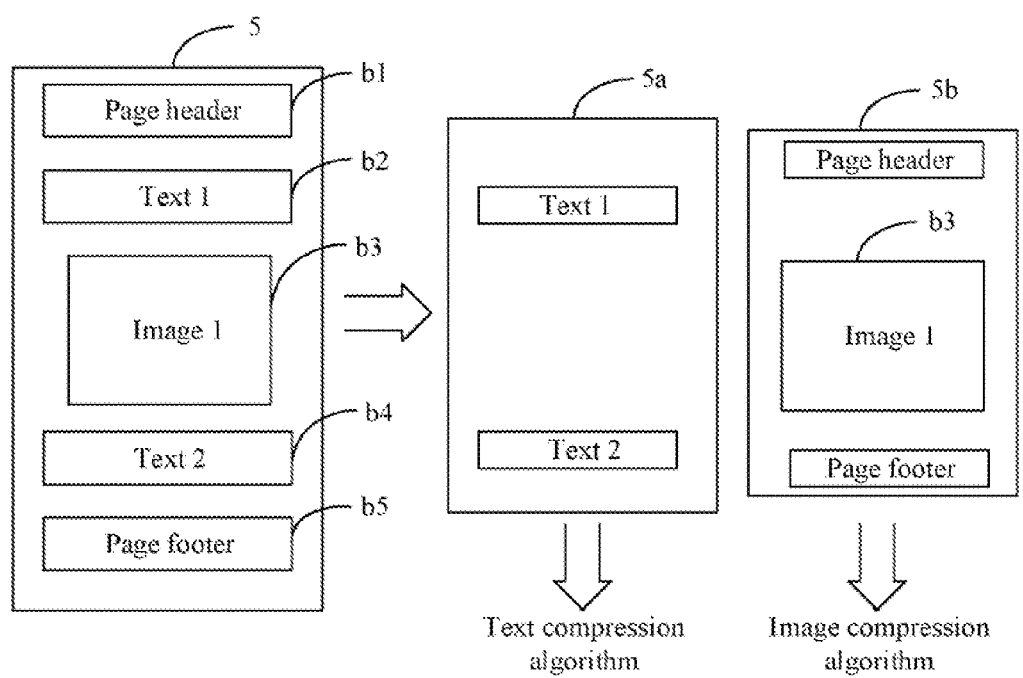
FIG. 5 shows one example of a method for dividing a test file into a plurality of sections.

In block S1, the conversion module 303 divides the test file into a plurality of sections in accordance with types of the sections. In one embodiment, the types of the sections include at least an image section and a text section. It is understood that the conversion module 303 can divide the test file according to a number of color pixels contained in the section. For example, if the number of color pixels in the section is greater than or equal to a preset threshold value (e.g., a half of a total number of pixels in the section), the section is the image section. If the number of color pixels in the section is less than the preset threshold value, the section is the text section. Referring to FIG. 5, the test file 5 to be compressed is divided into five sections: b1, b2, b3, b4, and b5, where sections b1, b3, and b5 are image sections, and sections b2 and b4 are text sections.

In block S2, the conversion module 303 determines the type of each of the sections. If the section is the image section, the process goes to block S3. If the section is the text section, the process goes to block S4 if the section is the text section.

In block S3, the conversion module 303 compresses the image sections with an image compression algorithm (referred to 5b of FIG. 5). In one embodiment, the image compression algorithm may be a DCT-based (e.g., JPEG) compression algorithm or Wavelet-based (e.g. JPEG2000) compression algorithm.

In block S4, the conversion module 303 compresses the text sections with a text compression algorithm (refer to 5a of FIG. 5). In one embodiment, the text compression algorithm may be a fax encoding algorithm, such as CCITT Group 3 or CCITT Group 4, and the section compressed by the text compression algorithm is a binary image.

In block S5, the conversion module 303 concatenates the image sections and the text sections to obtain the compressed file. In one embodiment, the conversion module 303 obtains a header of each page, concatenates each compressed section to a same page according to the header of the page, and concatenates all of the pages to obtain the compressed file.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A file encryption system, comprising:
   a storage system storing a test file;
   at least one processor; and
   a file encryption unit being executable by the at least one processor, the file encryption unit comprising:
   a receiving module to receive a login request of a user from a client computer to encrypt the test file;
   a determination module to determine if a certificate authority (CA) certificate of the user obtained from a CA server is valid;
   a conversion module to convert the test file into a compressed file having a specific format by a file encryption server, in response to a determination that the CA certificate of the user is valid;
   an obtaining module to send a search request to the CA server to obtain a public key of the CA certificate of the user;
   a generation module to generate a random key using a random function; and
   an encryption module to symmetrically encrypt the compressed file using the random key, asymmetrically encrypt the random key using the public key to generate an asymmetric encryption key, and attach the asymmetric encryption key and data length of the asymmetric encryption key to a header of the compressed file.

2. The system of claim 1, wherein the CA certificate of the user comprises the public key, a serial number and identity information of the user.

3. The system of claim 1, wherein the encryption module symmetrically encrypts the compressed file with the random key using a data encryption standard (DES) or an advanced encryption standard (AES) algorithm.

4. The system of claim 1, wherein the encryption module asymmetrically encrypts the random key to generate the asymmetric encryption key with the public key using an RSA encryption algorithm.

5. A file encryption method implemented by a computerized device, the method comprising:
   receiving a login request of a user to encrypt a test file;
   determining if a certificate authority (CA) certificate of the user is valid;
   converting the test file into a compressed file having a specific format in response to a determination that the CA certificate of the user is valid;
   sending a search request to a CA server to obtain a public key of the CA certificate of the user;
   generating a random key using a random function;
   symmetrically encrypting the compressed file using the random key;
   asymmetrically encrypting the random key using the public key to generate an asymmetric encryption key; and
   attaching the asymmetric encryption key and data length of the asymmetric encryption key to a header of the compressed file.

6. The method of claim 5, wherein the CA certificate of the user comprises the public key, a serial number and identity information of the user.

7. The method of claim 5, wherein the compressed file is symmetrically encrypted with the random key using a data encryption standard (DES) or an advanced encryption standard (AES) algorithm.

8. The method of claim 5, wherein the random key is asymmetrically encrypted to generate the asymmetric encryption key with the public key using an RSA algorithm.

9. The method of claim 5, wherein the converting step further comprises:
   dividing the test file into a plurality of sections in accordance with types of the sections, wherein the types of the sections include an image section and a text section;
   compressing the image sections with an image compression algorithm;
   compressing the text sections with a text compression algorithm; and
   concatenating the image sections and the text sections to obtain the compressed file.

10. The method of claim 9, wherein the type of the sections is determined according to a number of color pixels contained in the section.

11. The method of claim 9, wherein the image compression algorithm is a DCT-based compression algorithm or a Wavelet-based compression algorithm.

12. The method of claim 9, wherein the text compression algorithm is a CCITT Group 3 or a CCITT Group 4.

13. A non-transitory computer-readable medium having stored thereon instructions that, when executed by a computing device, causing the computing device to perform a file encryption method, the method comprising:
   receiving a login request of a user to encrypt a test file;
   determining if a certificate authority (CA) certificate of the user is valid;
   converting the test file into a compressed file having a specific format in response to a determination that the CA certificate of the user is valid;
   sending a search request to a CA server to obtain a public key of the CA certificate of the user;
   generating a random key using a random function;
   symmetrically encrypting the compressed file using the random key;
   asymmetrically encrypting the random key using the public key to generate an asymmetric encryption key; and
   attaching the asymmetric encryption key and data length of the asymmetric encryption key to a header of the compressed file.

14. The non-transitory storage medium of claim 13, wherein the CA certificate of the user comprises the public key, a serial number and identity information of the user.

15. The non-transitory storage medium of claim 13, wherein the compressed file is symmetrically encrypted with the random key using a data encryption standard (DES) or an advanced encryption standard (AES) algorithm.

16. The non-transitory storage medium of claim 13, wherein the random key is asymmetrically encrypted to generate the asymmetric encryption key with the public key using an RSA encryption algorithm.

17. The non-transitory storage medium of claim 13, wherein the converting step further comprises:
   dividing the test file into a plurality of sections in accordance with types of the sections, wherein the types of the sections include an image section and a text section;
   compressing the image sections with an image compression algorithm;
   compressing the text sections with a text compression algorithm; and
   concatenating the image sections and the text sections to obtain the compressed file.

18. The non-transitory storage medium of claim 17, wherein the type of the sections is determined according to a number of color pixels contained in the section.

19. The non-transitory storage medium of claim 17, wherein the image compression algorithm is a DCT-based compression algorithm or a Wavelet-based compression algorithm.

20. The non-transitory storage medium of claim 17, wherein the text compression algorithm is a CCITT Group 3 or a CCITT Group 4.

* * * * *